3,274,270
PYROLYSIS OF SODIUM TRIBROMOACETATE
John E. Harris, Boston, Mass., assignor to Monsanto Research Corporation, St. Louis, Mo., a corporation of Delaware
No Drawing. Filed Oct. 1, 1963, Ser. No. 312,887
4 Claims. (Cl. 260—654)

This invention relates to a novel method of producing halogenated compounds, and more particularly, to a novel method of producing halogenated hydrocarbon products by pyrolysis of a tribromoacetate alkali metal salt.

It has long been known that trihaloacetate metal salts can be decomposed by pyrolysis. The products vary depending on the conditions used.

In a protonic solvent, heating sodium tribromoacetate produces bromoform, carbon dioxide and a sodium carbonate salt (Ber., 4, 371). Sodium trichloroacetate behaves similarly:

$$Cl_3CCOONa \xrightarrow{EtOH} CO_2 + CHCl_3 (+ NaHCO_3)$$

(J. Am. Chem. Soc., 56, 571). Decarboxylation also occurs in a nonprotonic solvent, here proceeding by the reaction $$Cl_3CCOONa \rightarrow CO_2 + NaCl + :CCl_2$$

The dichlorocarbene radical, $:CCl_2$ is trapped by olefins, and can be recovered as the adduct with an olefin (Proc. Chem. Soc. 1959, 229).

Salts of the perfluoroalkanoic acids do not decompose under such mild conditions, but do decarboxylate when pyrolyzed dry. When sodium trifluoroacetate is heated thus, the products are trifluoroacetyl fluoride and trifluoroacetic anhydride $$F_3CCOONa \rightarrow F_3CCOF + (CF_3CO)_2O$$

The same acid derivatives are the products when the lithium and calcium salts are pyrolyzed similarly (J. Am. Chem. Soc., 75, 4525), and when the barium salt of trifluoroacetic acid is pyrolyzed dry under vacuum (J. Am. Chem. Soc., 62, 3477).

Some attention has been given to studies of dry decarboxylation of trichloroacetate salts. Thus, calcium trichloroacetate was pyrolyzed, and it was found that the organic products were similarly chiefly oxygenated materials, such as $Cl_3CCOOH$, $Cl_3CCOCl$, $(Cl_3CCO)_2O$, and $COCl_2$ (J. Gen. Chem. U.S.S.R., 21 (1951), 1783). Silver trichloroacetate also is known to decompose to trichloroacetic anhydride, though if the decomposition takes place in the presence of cyclohexene, dichloronorcarane is recovered, shown the presence of some dichlorocarbene in the reaction mixture (Angew. Chem., 72, 416).

In accordance with the present invention, anhydrous sodium tribromoacetate is pyrolyzed dry, that is, in the absence of solvent, in an inert atmosphere. In contrast with the above-stated dry pyrolysis results obtained with other trihaloacetate salts, it is found that the chief products are non-oxygenated, bromine-substituted hydrocarbon compounds.

As will be appreciated from the foregoing, the formation of non-oxygenated, bromine-substituted hydrocarbons on such pyrolysis of sodium tribromoacetate is unexpected. Judging by the reported results of previous pyrolysis studies of trihaloacetate alkali metal salts, oxygenated materials such as the acid halide and anhydride would be the expected products. On the contrary, however, the oxygen in the carboxylate radical goes off as $CO_2$, and the products recovered from the anhydrous salt include no oxygen-containing materials at all.

Products stable at normal ambient temperatures which are formed by the present novel method include carbon tetrabromide and tetrabromoethylene. Moreover, in conducting the present reaction under a high vacuum when the products are caught in a trap cooled to low temperatures, it is found that the condensate includes a bright yellow material which remains solid up to above $-80°$ C. If this material is contacted with an olefin such as cyclohexene in a non-protonic solvent and the mixture is then warmed to room temperature, a solution is formed which contains o-dibromocyclohexane and dibromonorcarane. The norcaranes are bicyclic compounds in which the cyclohexane ring is fused to a cyclopropane ring, and this type of compound is known to be formed by addition of a carbene to cyclohexene. Thus, evidence has been obtained that one of the products of the reaction is dibromocarbene, $:CBr_2$.

Upon warming the yellow product containing the dibromocarbene to temperatures liquefying it, a permanently liquid product is obtained which contains tetrabromoethylene.

In conducting the vacuum pyrolysis of sodium tribromoacetate in accordance with this invention, the dry sodium salt will be heated to the decomposition temperature of the salt, which is approximately 201° C. In general, the temperature of the mass of the salt will be kept between 190 and 210° C.: unduly rapid or excessive heating may cause the decomposition to proceed at an uncontrollable rate. The system including the combustion chamber in which the pyrolysis is conducted is preferably maintained under a high vacuum. Initially, before the decomposition temperature of the salt is reached, the pressure in the system is desirably at least as low as about 1.0 mm. Hg, and preferably lower, as low as 0.01 mm. Hg or 0.0001 mm. Hg, for example. Of course, as volatile products begin to evolve from the salt as it decomposes, the pressure will rise in the system. However, to ensure rapid withdrawal of the pyrolysis products from the heating zone, a vacuum will be maintained, preferably to keep the pressure below about 10 mm. Hg, and generally, below about 1.0 mm. Hg, particularly where recovery of sensitive reaction products such as the carbene is desired.

The salt used to conduct the reaction should be anhydrous if the presence of products other than those produced by decomposition of the salt is to be avoided. When traces of water are present in the salt, hydrolysis occurs, with the result that tribromoacetic acid comes over with the other volatile products driven off from the salt charge, or the decomposition products of the acid, such as bromoform, are produced.

Also, oxygen must be rigidly excluded from the system. This can be accomplished by employing a sweep of inert gas such as nitrogen. Dibromocarbene is extremely sensitive to oxidation, and readily converted by oxygen of the air to dibromophosgene, $Br_2C=O$.

The system used to conduct the pyrolysis will also include means to collect the organic products of the decomposition. Generally, these products will condense at temperatures as low as $-80°$ C. or below under the lowered pressures in the system, and are conveniently collected in vessels cooled to such temperatures, connected to the outlet from the pyrolysis chamber.

Advantageously, the collecting vessels may contain a material reactive with the carbene product of the reaction. Although dibromocarbene can be distilled under the subatmospheric pressures in the system wherein it is generated, if the carbene is warmed to above its melting point at atmospheric pressure, it dimerizes to tetrabromoethylene. This self-condensation product of the carbene may if desired be recovered as a product of the present method. However, it may alternatively be advantageous to convert the carbene to a different reaction product, such as a coreaction product with an olefin. For example, dibromocarbene can add to cyclohexene to produce dibromonorcarane. It has been found in the practice of the present invention that if the solid carbene is contacted with such a coreactant and the mixture then warmed to liquefaction at atmospheric pressure, coreaction occurs in place of dimerization, and the coreaction product is obtained. Exemplary of such coreactant materials are olefins such as cyclohexene, 2-butene, 2,3-dimethyl-2-butene, 2-methyl-2-butene, isobutylene, styrene, methylindene, cyclopentene and the like. Conveniently, the material reactive with the carbene is included in a collecting vessel of the system in which the carbene is generated. The reactive mixture with which the carbene is contacted prior to its liquefaction also desirably includes a solvent; to avoid interference with formation of the carbene/olefin adduct, this will be a non-protonic solvent such as the dimethyl ether of ethylene glycol, the dimethyl ether of diethylene glycol or the like.

The invention is illustrated but not limited by the following examples, in which all temperatures given are degrees C.

The system used in following the procedure described below includes a combustion chamber consisting of a flat-bottomed, glass flask. The bottom of the chamber is immersed in an oil bath at 190–210° to heat the salt charge in the chamber. Dry nitrogen is passed through the flask to create an inert atmosphere in the system. The exit gas stream from the flask passes through a sintered disc, which serves to hold solids back, and into one or more collecting vessels cooled to temperatures condensing the volatile products evolved. Equipment is connected to the system to maintain it under subatmospheric pressures.

*Example 1*

The combustion chamber was charged with 5 grams of sodium tribromoacetate, and connected to two successive traps cooled to the temperature of liquid nitrogen. The system was evacuated to a pressure of about 0.1 mm. Hg, and the combustion chamber immersed in the oil bath at 200–205°. The decomposition of the salt, as evidenced by evolution of gaseous products, lasted for an hour.

The first trap contained cyclohexene and glyme (the dimethyl ether of ethylene glycol) frozen in the bottom. During the pyrolysis, solid white carbon dioxide and a yellow-colored material collected in this trap. At the end of the pyrolysis, the trap was separated from the combustion system, while maintaining the vacuum. A stream of hot air was blown against the trap to liquefy the cyclohexene and glyme, and the trap was shaken up so that the liquid contacted the yellow material frozen out on the side. The mixture was then allowed to stand overnight.

A portion of the resulting reaction mixture was heated to distill off unreacted cyclohexene and glyme, providing a concentrated reaction mixture which was analyzed by vapor phase chromatography (VPC). The contents were found to be carbon tetrabromide, dibromocyclohexane, and the product of adducing cyclohexene with dibromocarbene, dibromonorcarane, together with unreacted cyclohexene and glyme.

*Example 2*

The combustion chamber was charged with 5 g. of sodium tribromoacetate and connected to a reaction trap cooled to —80° containing deoxygenated cyclohexene and glyme, and a second trap cooled with liquid nitrogen. The starting and final pressures were 0.05 mm. Hg, during the period of 20 minutes during which the heating was continued.

The —80° trap was then removed from the system, and shaken to permit reaction to take place. After standing, it was concentrated to provide a residue weight of 2.3 g. VPC analysis showed a content of 1.2% dibromonorcarane.

*Example 3*

The combustion chamber was charged with 5 g. of the sodium salt and connected successively to a vessel including a condenser provided with a cold finger at —80° and after that, a trap cooled to the temperature of liquid nitrogen. The pressure was taken down to 0.0002 mm., and heat applied. In 5 minutes, the pressure rose to 0.2 mm., after 15 minutes, it was 0.3 mm., and thereafter it dropped, falling to 0.04 mm. by the end of the 4 hour heating period. The vessel containing the condenser was restored to atmospheric pressure by introduction of nitrogen, and the cooling bath removed. Part of the condensate melted to a brown oil at —28 to —26°, leaving a solid M. 91–92° after drying.

The solid M. 91–92° was found to be mainly carbon tetrabromide. The brown oil formed on liquefying the lower-melting compound was 25% tetrabromoethylene and 70% carbon tetrabromide.

*Example 4*

Using equipment as described previously, the products evolved by heating a 5 g. charge of sodium tribromoacetate for 5 hours were collected successively in a condenser provided with a cold finger cooled to —80° and a liquid-nitrogen-cooled trap. The products condensed at —80° included a yellow material, M. —32 to —30° and a liquid residue weighing 2 g., which was shown by VPC analysis to consist of 62% carbon tetrabromide and 26% tetrabromoethylene.

*Example 5*

Using equipment as described previously, with the combustion chamber connected successively to a trap cooled to —80° and one cooled to liquid nitrogen temperature, a charge of 5 g. of sodium tribromoacetate was heated for 4 and ½ hours. Initial and final pressures in the system were 0.0002 mm.; the maximum pressure during the run was 0.36 mm. The residue in the combustion chamber weighed 2 grams (equal to 89% decomposition).

When the material in the —80° trap was warmed to room temperature, it melted to an orange-brown oil weighing 2.1 g., which was 73% carbon tetrabromide and 21% tetrabromoethylene.

*Example 6*

The combustion chamber was charged with 5 g. of sodium tribromoacetate, connected to successive traps, each cooled with liquid nitrogen, and heated under a vacuum of between 0.0002 and 0.3 mm. for 4 hours, at which point the residue in the combustion chamber weighed 2.60 g. The reaction products were carbon tetrabromide and tetrabromoethylene.

*Example 7*

5 grams of sodium tribromoacetate was heated for 45 minutes in the combustion chamber under a stream of nitrogen at atmospheric pressure. The nitrogen exit stream was bubbled into a mixture of cyclohexene and glyme at room temperature (about 25°) and finally into a catch trap.

A portion of the reaction mixture in the trap containing the cyclohexene/glyme mixture was heated to remove most of the cyclohexene and glyme, providing a concentrated reaction mixture which was found to contain dibromocyclohexane and tribromoacetic acid, in addition to glyme and cyclohexene.

The second catch trap contained yellow fluid which was primarily tetrabromoethylene.

Solid deposited around the top of the combustion chamber was collected and analyzed by VPC and infrared spectrographic analysis. It was found to consist of tetrabromoethylene and carbon tetrabromide.

While the invention has been described with specific reference to particular preferred embodiments thereof,

What is claimed is:

1. The method which comprises heating anhydrous sodium tribromoacetate in the absence of a solvent to a temperature of about 200° C., in an inert, oxygen-free atmosphere, at sub-atmospheric pressures, and condensing the volatilized reaction product at a temperature below about 0° C.

2. The method which comprises heating anhydrous sodium tribromoacetate in the absence of a solvent in an inert, oxygen-free atmosphere under a vacuum of below about 10 mm. Hg to a temperature of about 200° C., and condensing the volatilized reaction product at a temperature below about 0° C.

3. The method of claim 1, wherein the anhydrous sodium tribromoacetate is heated under the said conditions at subatmospheric pressures below about 10 mm. Hg.

4. The method of producing carbon tetrabromide and tetrabromoethylene which comprises heating anhydrous sodium tribromoacetate to about 200° C., in an inert, oxygen-free atmosphere, under a vacuum of below about 1 mm. Hg, condensing the volatile reaction products at a temperature below about 0° C., and warming the condensate to a temperature of between 0° and 50° C., sufficient to liquefy the condensate.

References Cited by the Examiner

German Auslegeschrift (Wagner) No. 1,121,046, January 1962.
Schaffer, Berichte, 4, p. 371.
Verhoek, J. Amer. Chem. Soc., 56, pp. 571–7.
Wagner et al., Rec. Trav. Chim., 81, pp. 925–32.

LEON ZITVER, *Primary Examiner.*

LORRAINE A. WEINBERGER, *Examiner.*

K. V. ROCKEY, *Assistant Examiner.*